(12) United States Patent
Hakala et al.

(10) Patent No.: US 11,084,690 B2
(45) Date of Patent: Aug. 10, 2021

(54) ELEVATOR COMPRISING AN ELECTRIC LINEAR MOTOR

(71) Applicant: KONE Corporation, Helsinki (FI)

(72) Inventors: Tero Hakala, Helsinki (FI); Ari Kattainen, Helsinki (FI); Jussi Lähteenmäki, Helsinki (FI); Seppo Suur-Askola, Helsinki (FI); Jussi Perälä, Helsinki (FI); Tero Purosto, Helsinki (FI)

(73) Assignee: KONE CORPORATION, Helsinki (FI)

( * ) Notice: Subject to any disclaimer, the term of this patent is extended or adjusted under 35 U.S.C. 154(b) by 725 days.

(21) Appl. No.: 15/901,987

(22) Filed: Feb. 22, 2018

(65) Prior Publication Data

US 2018/0251343 A1 Sep. 6, 2018

(30) Foreign Application Priority Data

Mar. 2, 2017 (EP) ..................................... 17158966

(51) Int. Cl.
*B66B 11/04* (2006.01)
*B66B 5/00* (2006.01)
(Continued)

(52) U.S. Cl.
CPC ............ *B66B 11/0407* (2013.01); *B66B 1/28* (2013.01); *B66B 1/32* (2013.01); *B66B 1/3453* (2013.01);
(Continued)

(58) Field of Classification Search
CPC ... B66B 11/0407; B66B 1/3453; B66B 5/027; B66B 5/18; B66B 5/0037; B66B 1/32;
(Continued)

(56) References Cited

U.S. PATENT DOCUMENTS 5,020,639 A * 6/1991 Michel ................ B66B 11/0293
187/346
5,033,587 A * 7/1991 Nakai ................. B66B 11/0407
187/289
(Continued)

FOREIGN PATENT DOCUMENTS

CN 104876099 A 9/2015
WO WO 2016/207136 A1 12/2016

*Primary Examiner* — Jeffrey Donels
(74) *Attorney, Agent, or Firm* — Birch, Stewart, Kolasch & Birch, LLP.

(57) ABSTRACT

The invention relates to an elevator comprising an electric linear motor comprising at least one linear stator designed to be located in a fixed correlation to an environment, particularly building, and at least one mover designed for connection with an elevator car to be moved and co-acting with the stator to move the car, which motor comprises a stator beam supporting said at least one stator, which stator beam has at least one side face carrying ferromagnetic poles of said stator spaced apart by a pitch, and which mover comprises at least one counter-face facing said side face(s) of the stator beam, in which counter-face electro-magnetic components of the mover are arranged to co-act with the ferromagnetic poles mounted on the stator beam, which elevator comprises an elevator brake. According to the invention the side face of the stator beam facing the mover and/or the counter face of the mover facing the side face of the stator beam comprise(s) a brake surface which form(s) the brake interface of the elevator brake.

21 Claims, 9 Drawing Sheets

(51) Int. Cl.
- *B66B 5/04* (2006.01)
- *B66B 5/16* (2006.01)
- *B66B 1/34* (2006.01)
- *B66B 1/28* (2006.01)
- *H02K 41/03* (2006.01)
- *H02K 7/102* (2006.01)
- *H02P 3/08* (2006.01)
- *H02P 25/064* (2016.01)
- *B66B 1/36* (2006.01)
- *B66B 1/32* (2006.01)
- *B66B 9/02* (2006.01)
- *B66B 5/02* (2006.01)
- *B66B 5/18* (2006.01)
- *B66B 9/00* (2006.01)

(52) U.S. Cl.
CPC .......... *B66B 1/3461* (2013.01); *B66B 1/3476* (2013.01); *B66B 1/3492* (2013.01); *B66B 1/36* (2013.01); *B66B 5/0025* (2013.01); *B66B 5/0031* (2013.01); *B66B 5/0037* (2013.01); *B66B 5/0093* (2013.01); *B66B 5/027* (2013.01); *B66B 5/04* (2013.01); *B66B 5/16* (2013.01); *B66B 5/18* (2013.01); *B66B 9/02* (2013.01); *H02K 7/1023* (2013.01); *H02K 41/033* (2013.01); *H02P 3/08* (2013.01); *H02P 25/064* (2016.02); *B66B 9/003* (2013.01); *B66B 2201/00* (2013.01); *B66B 2201/30* (2013.01)

(58) Field of Classification Search
CPC ....... B66B 9/02; B66B 5/0031; B66B 5/0093; B66B 5/04; B66B 5/16; B66B 1/3492; B66B 1/3461; B66B 1/28; B66B 1/3476; B66B 5/0025; B66B 1/36; B66B 2201/30; B66B 2201/00; B66B 2201/34; B66B 9/003; B66B 7/044; H02K 41/033; H02K 7/1023; H02K 41/02; H02P 3/08; H02P 25/064

See application file for complete search history.

(56) References Cited

U.S. PATENT DOCUMENTS

| | | | | |
|---|---|---|---|---|
| 5,062,501 | A | * | 11/1991 | Pavoz ................. B66B 11/0407 187/289 |
| 5,625,174 | A | * | 4/1997 | Ito ....................... B66B 11/0055 187/289 |
| 2012/0193172 | A1 | * | 8/2012 | Matscheko ......... B66B 11/0407 187/289 |
| 2017/0355560 | A1 | * | 12/2017 | Herkel ................. B66B 5/0037 |
| 2017/0362062 | A1 | * | 12/2017 | Ginsberg ............. H02K 41/031 |
| 2018/0251343 | A1 | * | 9/2018 | Hakala ..................... B66B 1/32 |

* cited by examiner

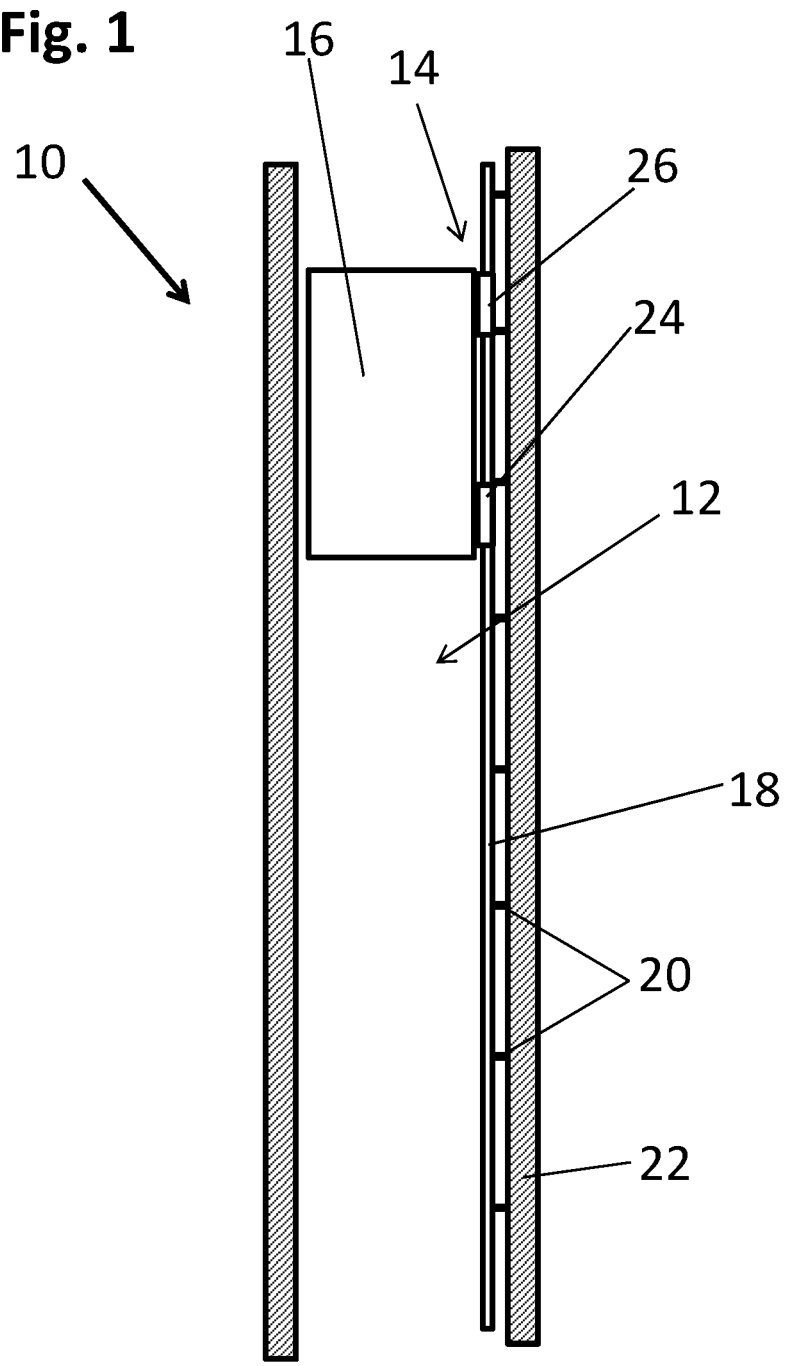

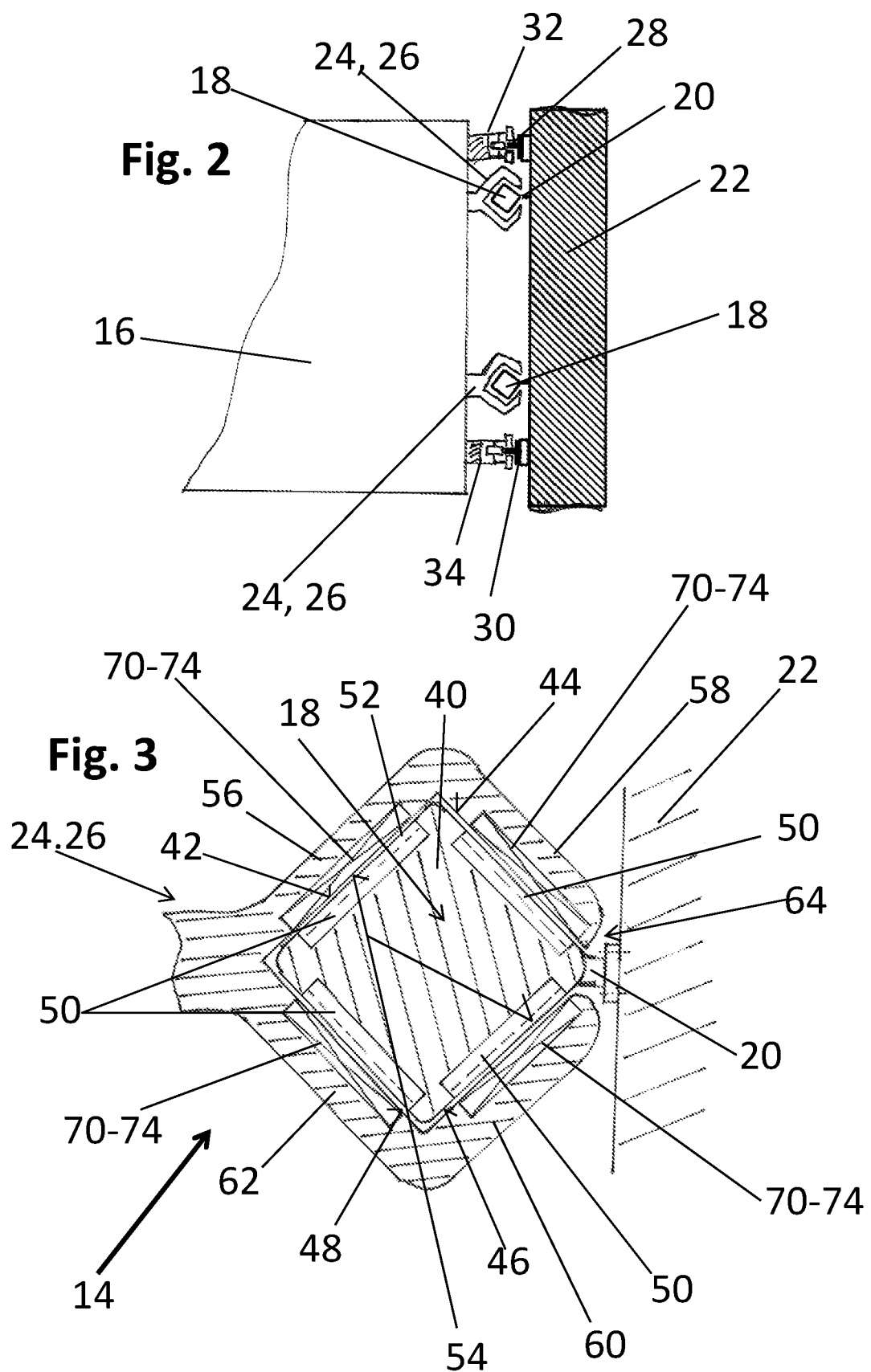

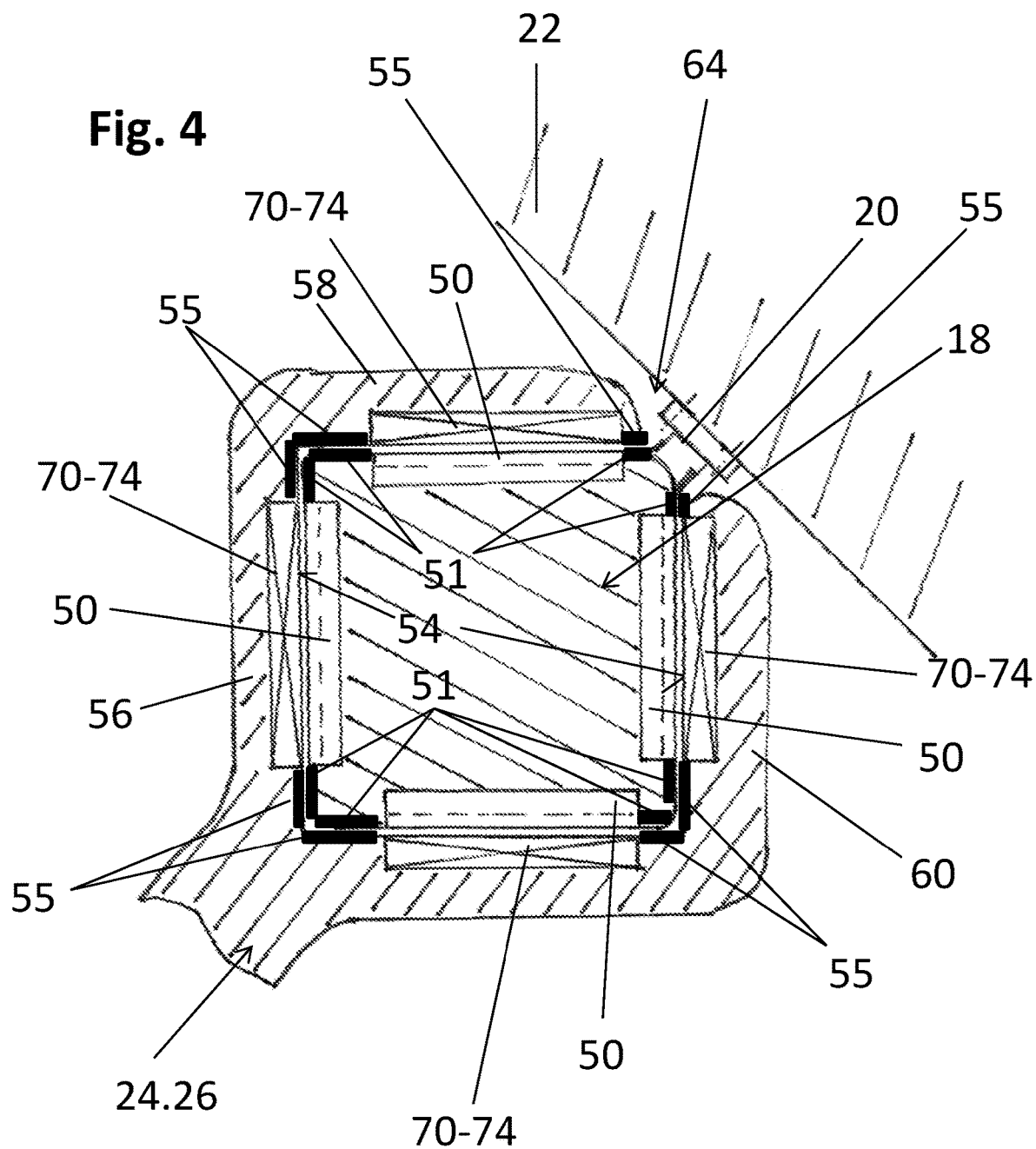

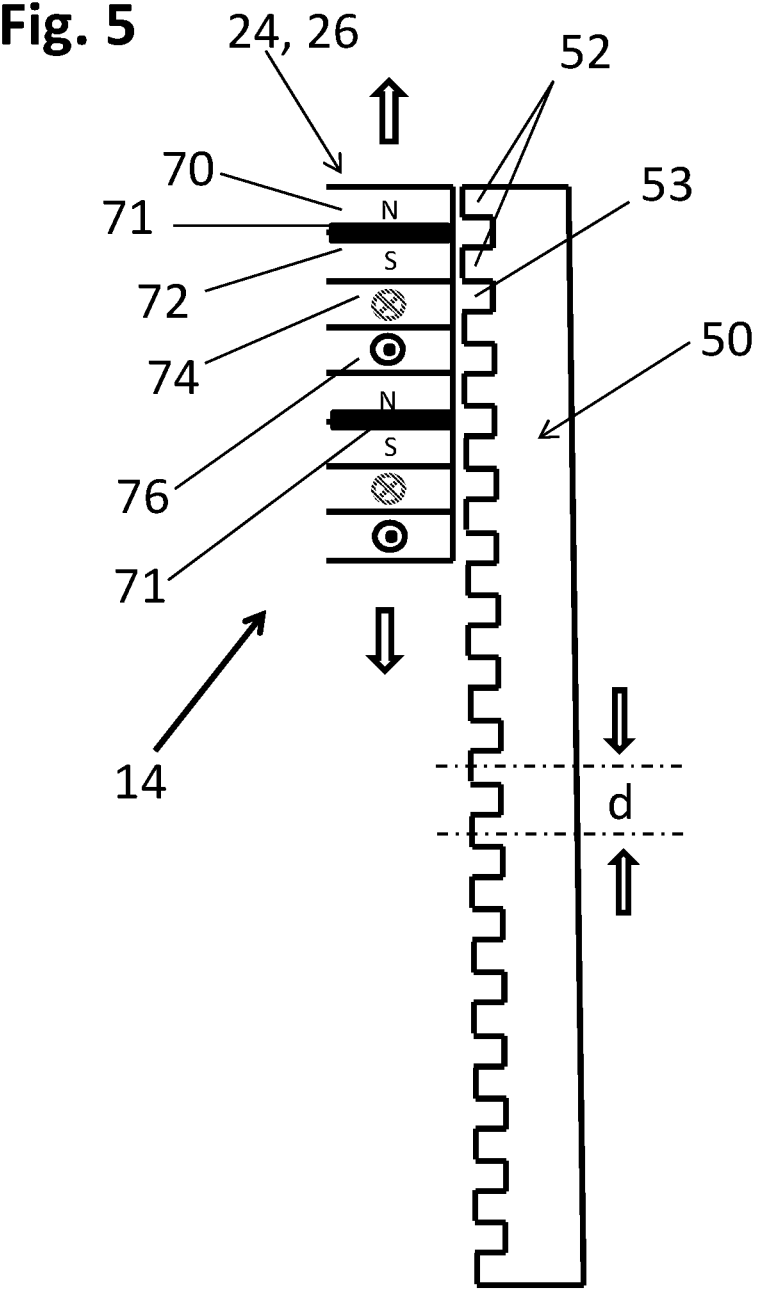

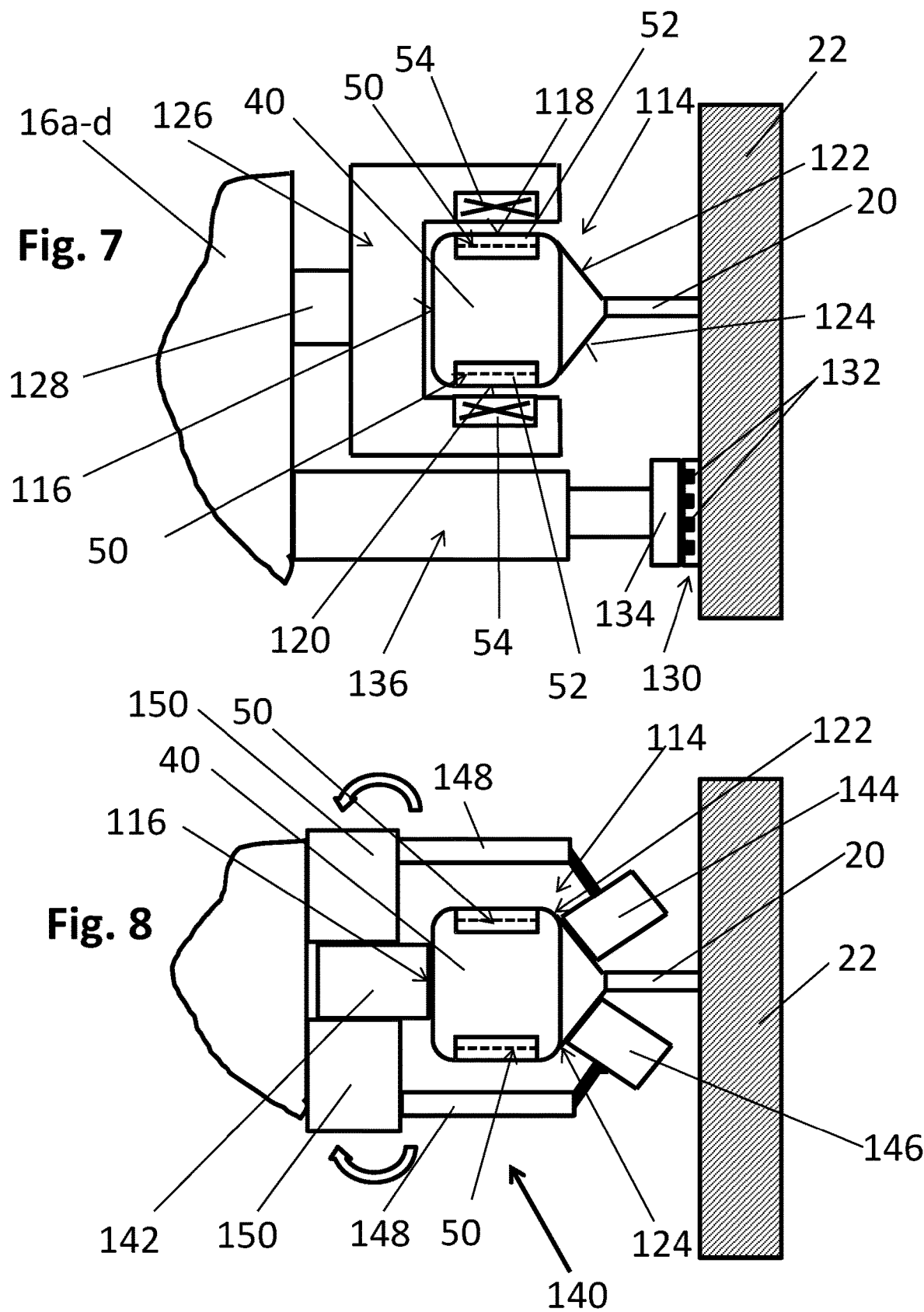

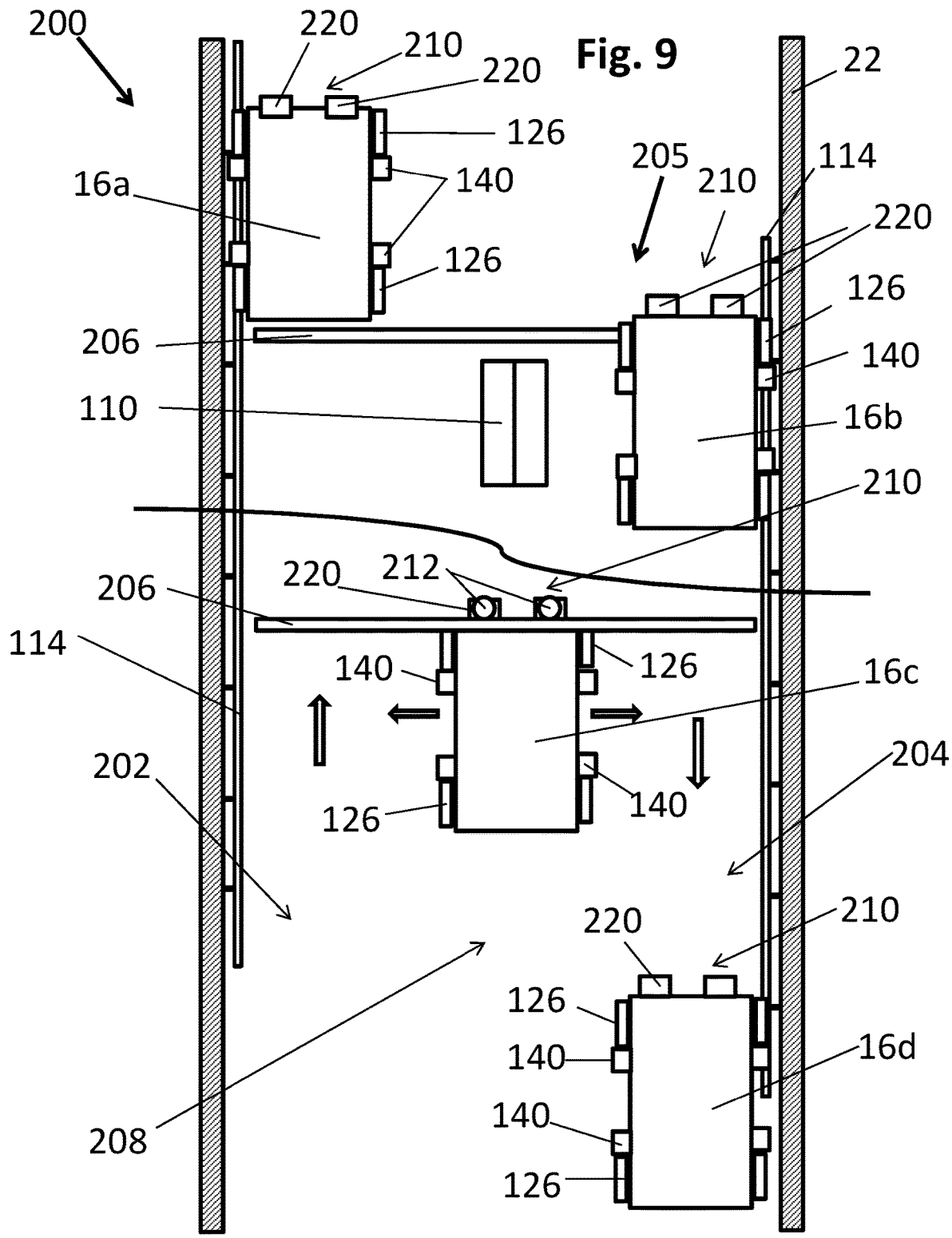

ELEVATOR COMPRISING AN ELECTRIC LINEAR MOTOR

The present invention relates to an elevator comprising an electric linear motor as it is disclosed in the WO 2016/207136 A1. The linear motor comprises a linear stator designed to be located in a fixed correlation to an environment, particularly a building. The elevator further comprises at least one mover designed for connection with an elevator car to be moved and co-acting with the stator to move the car. The motor comprises a stator beam supporting said at least one stator, which stator beam has at least one side face carrying ferromagnetic poles of said stator spaced apart by a pitch. Accordingly, the mover comprises at least one counter-face facing said side face of the stator beam, in which counter-face electromagnetic components of the mover are arranged to co-act with the ferromagnetic poles of the stator beam. During the operation of the elevator, particularly when the elevator car is running, the magnetic field of the electromagnetic components of the mover keep the counter-face of the mover spaced apart from the side face of the stator by an air gap a. This new technology has proved to be quite efficient, particularly in elevator constructions in which the travelling of the car is not only vertical. For this reason, the general design of elevator brakes which were always based on the braking of the traction sheave driving an elevator car via the hoisting ropes is not applicable in this concept. Furthermore, brakes provided in connection with the guide rails of the elevator complicate the complete elevator construction as generally the provision of the stator beams in connection with the movers would be per se sufficient also to guide the elevator car through the elevator shaft, so that elevator guide rails and related brake constructions may be omitted.

It is therefore object of the invention to provide an efficient elevator brake for an elevator with a linear motor. The object is solved with an elevator according to claim 1 as well as with a method according to claim 11. Advantageous embodiments of the invention are subject matter of the corresponding dependent claims. Preferred embodiments of the invention are also subject matter of the description and of the drawings.

According to the invention, the side face of the stator beam facing the mover and the counter-face of the mover facing the side face of the stator beam have a brake surface which act as the brake interface of the elevator brake when getting in mutual contact when the windings of the electromagnetic components of the mover are at least partly de-energized. As it has been mentioned above, during the run of the elevator, the electromagnetic components of the mover are operated as to provide a magnetic counter-field which keeps the counter-face of the mover apart from the side face of the stator with an air gap in between. The elevator control is configured to shut off the energization of the electromagnetic components of the mover when the elevator stops, so that the air gap brakes down and the counter-face and the side face of the stator beam get into mutual contact. As the counter-face and/or the side face have a brake surface, for example by being covered with an adapted brake pad material, the elevator car is kept at its level via the mere friction between the brake surface on the counter-face of the mover and the side face of the stator beam. Thus an effective elevator brake is provided for the linear motor.

In a preferred embodiment of the invention, the side face of stator beam and/or the counter-face of the mover, preferably both comprise a brake pad. Via these brake pads, the braking properties of the co-acting brake surfaces of the side face and counter-face can be clearly defined as to keeping the elevator car stopped at the stopping level even in case of overload situations. Preferably, the brake pad is releasably fixed to the stator beam/mover and is thus replaceable in case it is worn out. Alternatively, the brake surfaces may be coated with this wear-resistant foil. The air gap of the motor is very short, appx. 1.5 mm. A wider air gap would mean that torque-generating properties of the motor are reduced. Thus a foil is preferable to provide the wear-resistant brake surface.

In this context it should be mentioned that either the mover has a certain vertical length which is sufficient to provide the necessary brake interface or at least two movers are provided which are vertically displaced so that the two movers grip one stator beam at two vertically spaced apart sections, particularly in the vertical area of the car top and the car bottom. Via this construction, the car is reliably supported by the movers which are supported themselves on the stator beam, and on the other hand, the surfaces which take up the load of the car are clearly defined. In case of two vertical spaced apart movers the load situation is such that with the upper mover the surface facing away from the elevator car is loaded by the elevator car weight whereas with the lower mover it is the surface facing the elevator car which is loaded by the elevator car weight. This is good because door sill gap between car floor and landing can be minimized.

In a preferred embodiment of the invention, the brake surface may be mounted releasably on the counter-face and/or side face. Thus, the brake surface of the counter-face and/or side face can be changed when being worn off.

Preferably, the elevator comprises a backup-power supply and an emergency stop circuit, which is connected to a position—and/or velocity—and/or acceleration sensor, and which emergency stop circuit is configured to adjust the energization of the electromagnetic components of the mover depending on the signal of the above sensor(s). Via this means it can be ensured that in any case of power off, the elevator does not suddenly stop but via the backup power supply, the emergency stop circuit ensures deceleration of the elevator car within allowed tolerances until the stop of the elevator car. This measure ensures the safety of the passengers in any case of power failure of the AC mains.

Preferably, this backup-power supply is a battery, but it also may be a series of super-capacitors and/or second independent power supply network.

In case a battery is used as a backup-power supply, the elevator preferably comprises a battery monitoring circuit for monitoring the function or status of the battery. By this means it can be ensured that the functional status of the battery is such that the elevator stop circuit is always able to ensure a smooth elevator stop drive in case of power off as mentioned above.

Preferably, the emergency stop circuit is configured to adjust the energization of the electromagnetic components of the mover such that the car stops within a defined stopping distance. By this measure, the stopping distance for an emergency stop of the elevator car can be made equal in the upwards as well as in the downwards direction so that a power off in the upwards direction would not lead to a shorter stopping distance than an emergency stop in the downwards direction. In this connection it has to be mentioned that the elevator concept with linear motor regularly uses no counterweight so that there is always the gravitational force of the elevator car and carload pulling the elevator car downwards so that usually the stopping distance in downwards direction would be larger than in upwards direction. By this measure it is also possible to ensure in emergency stopping situation that an elevator car of a multicar system stops with a stopping distance such that car does not collide with another car in same shaft.

In a preferred embodiment of the invention with a brake test mode, the car comprises at least two movers and the elevator control is configured to keep—when the car is not moving—one mover energized whereas the other mover is de-energized, particularly if the car is stopping at a floor. In this brake test mode of the elevator it can be checked whether the braking ability of the brake interface between the side surface of the stator and the counter-face of the mover in connection with the load acting on the surfaces is sufficient to provide the required braking results.

Preferably, the elevator control is configured to increase the energization of the energized mover until the car starts moving, and that the elevator control is configured to issue a report to a maintenance center comprising the critical energization value at the point when the elevator car starts moving. Via this measure, the maintenance center of the elevator can obtain a log file from the elevator for all brake tests. The log files may be helpful to derive a maintenance requirement or the necessity of an exchange of the brake surface or the like.

Preferably, the elevator control is configured to issue a failure signal and/or to put the elevator car out of service when the critical energization value exceeds a defined threshold value. This threshold value may define a limit above which the elevator is evaluated as being okay and below which the functional state of the brake is deemed as not being fulfilling the requirements. Of course, two threshold values can be established whereby a first threshold value for comparing the energization value when the elevator car starts to move is used to derive a maintenance signal and the second lower threshold value is established to define a point when the elevator is taken out of service. Thus, the two threshold values can be established to define three different states of the elevator brake: 1.: Brake is in order, 2.: Brake needs maintenance, 3.: Brake does not meet the safety requirements. Via this measure, the safety of the elevator can be established on a high level.

It has to be mentioned that preferably the elevator comprises at least two parallel stator rods which are located on one side of the elevator car but on the left and right corners thereof. Furthermore, advantageously per stator rod, two vertically spaced apart movers are used, preferably at the upper and lower edge of the elevator car so that preferably, a total of two stator rods and four movers are used to support, i.e. to drive as well as to stop, the elevator car. Preferably each mover has its own drive such as a frequency converter.

The present invention further refers to a method for operating an elevator with a linear motor, which linear motor comprises at least one linear stator designed to be located in a fixed correlation to an environment, particularly building. The elevator further comprises at least one mover designed for connection with an elevator car to be moved and co-acting with the stator to move the car. The motor comprises a stator beam supporting said at least stator, which stator beam has at least one side face carrying ferromagnetic poles of said stator spaced apart by a pitch. The mover of the motor comprises at least one counter-face facing said side face of the stator beam, in which counter-face electromagnetic components as for example coils of the mover are arranged to co-act with the ferromagnetic poles of the stator beam. According to the invention, the side face of the stator facing the counter-face of the mover and/or the counter-face of the mover facing the side face of the stator are used as a brake interface when coming in mutual contact due to a de-energization of the electromagnetic components of the mover.

With respect to the advantages and features of this method, it is referred to the statements in connection with the inventive elevator.

Preferably, the electromagnetic components of the mover are de-energized dependent on the signal of a position—and/or velocity—and/or acceleration sensor which enables a certain stopping distance for the stopping of the elevator car.

Preferably, the motor has a backup-power supply, preferably battery, as well as an emergency stop circuit which ensures that in any case of power failure of the AC mains, the elevator car is decelerated over a defined stopping distance, preferably independent of the driving direction of the elevator car.

Preferably, the mover is de-energized when the car stops at an elevator floor which automatically leads to the engagement of the brake interface so that the elevator is effectively stopped via the interaction of the stator side face and the mover's counter-face.

Preferably, the elevator may be run in a brake test mode when the elevator car stops, preferably at a floor. In this brake test mode, one of the movers is de-energized whereas the other mover is energized. It is clear that this method can only be provided in an elevator with at least two movers or one mover which can be operated to be partially energized and partially de-energized, whereby the energized and de-energized parts of the mover are in this case preferably separated in vertical direction. Usually, an elevator has four movers per elevator car, particularly in the corners of one side face of the elevator car. In this case, two movers are energized and the other two movers are de-energized. It is on the other hand also possible to de-energize one mover and to energize three movers. This last alternative is preferable because then the required driving force is tolerable (three force-generating motors vs. one brake).

Preferably, during this brake test mode, the energization of the energized mover(s) is increased until the car starts moving, which is the critical energization value. This critical energization value when the elevator car starts moving is used to evaluate whether or not the brake is in a functional good state.

Preferably, on this behalf, the energization value is compared with at least one threshold value, which allows the differentiation of brake in order/brake has to be maintained or is not working in a sufficient manner to provided required safety. Preferably two threshold values are provided for comparison with the critical energization value, so that three different operational status of the brake can be identified: brake in order, brake needs maintenance and brake is not safe as mentioned above in connection with the description of the inventive elevator.

Preferably, the energization of the mover coils(s) is adjusted to a value corresponding to a test force F defined as follows:

$$F=(M+L)g/(N-1)$$

wherein

F is required test force for testing one brake at a time

M is weight of empty elevator car in kilograms

L is rated maximum load of elevator car in kilograms g is gravity constant 9.81

N is number of brakes/movers in one car.

Example: N=4 movers/brakes, M=800 Kg, L=1000 Kg, then $$F=1800\ Kg*9.81/3=5886\ N.$$

This also fulfils the requirement that all N brakes must hold together (125%*L+M)g In the above example the requirement is: (125%*1000 Kg+800 Kg)9.81=20110 N. On the other hand it has already been tested that 4 brakes can perform: 4*5886 N=23544 N which is sufficient.

If this test force does not lead to the car starts moving, the brake test is terminated and the brake is evaluated as being in order.

In a method according to an embodiment the car has N movers. The method comprises: an empty car is kept standstill by providing a driving force upwards, or otherwise in a direction opposite to the interaction of gravity, with all the N movers, and total current $I_{tot}$ of all N movers is determined. Current of one of the movers is interrupted to apply the mover as an elevator brake, and driving current of the other movers is at the same time raised to a value: $I_{tot}/(N-1)$. The driving current of the other movers is gradually decreased, and movement of elevator car is observed. When movement of elevator car is detected, the driving current at the moment movement started is recorded, and the recorded current is compared to a reference value. If the recorded current is higher that the reference value, safety measures with the elevator are performed. This means that brake test may be performed without the movers having a load sensor.

In a method according to another embodiment car has N movers, and each mover has a load sensor, such as a strain gauge, arranged between the car and the mover to measure total weight of the car. The method comprises: current of one of the movers is interrupted to apply the mover as an elevator brake. An empty car is kept standstill by providing a driving force upwards, or otherwise in a direction opposite to the interaction of gravity, with the other N−1 movers, such that the load sensor of the mover applied as an elevator brake indicates preferably zero weight. The driving current of the other N−1 movers is gradually decreased, and movement of elevator car is observed. When movement of elevator car is detected, the reading of the load sensor of the mover applied as elevator brake at the moment movement started is recorded, and the recorded reading is compared to a reference value. If the recorded reading of the load sensor is lower than the reference value, safety measures with the elevator are performed. According to a refinement, at the same time the driving current of the other N−1 movers is gradually decreased, the reading of the load sensor of the mover applied as an elevator brake is observed and compared to said driving current, to ensure that decreasing of the driving current causes reading of the load sensor to increase with a predefined pattern. This means that correct operation of the load sensor can be monitored.

In some embodiments, it may be also necessary to not only decrease the driving force during testing but also to further increase it in the opposite direction, e.g. in the downwards direction or otherwise in the direction of interaction of gravity, to increase the test force to a magnitude required for testing.

When in comparison of the critical energization value with the above-mentioned threshold value or values, adapted safety measures are taken which correspond to the grade of the functional status of the elevator. For example, if the energization value exceeds a threshold value forming a limit for the safety of the elevator brake, the elevator is immediately put out of operation. Anyway, depending on the kind of threshold value, different safety measures can be taken. These safety measures comprise following steps:

sending a log report with the critical energization value to a maintenance center,
sending a log report with the threshold value and with the critical energization value to the maintenance center,
putting the elevator out of service,
issuing a maintenance request.

Thus, the operational state of the brake based on the brake interface between the stator's side face and the mover's counter-face can be monitored to ensure a high safety level of the elevator brake.

It is clear for the skilled person that the above-mentioned embodiments can be combined with each other arbitrarily. It has been mentioned that preferably an elevator car is supported with two stator beams and two vertically spaced apart movers which means four movers per elevator car. This number of movers per elevator car may differ from this value. If the stator beam is large enough as well as the mover is large and long enough, even one stator beam and one mover per elevator car may be sufficient to support the car and to implement the necessary brake interface. In this case, a brake test could be performed if a part of the length of the mover is energized and the other part of the length of the mover is de-energized. Thus, by separating energized and de-energized sections of the single mover, the brake test mode can be performed in the same way as if several movers were present.

Following terms are used as synonyms: critical energization value—energization value when the car starts moving in the brake test mode; elevator control—elevator motor control; car—elevator car; brake interface—elevator brake The invention is hereinafter described via an example with the aid of the enclosed drawings.

BRIEF DESCRIPTION OF THE DRAWINGS

The invention is now described hereinafter with respect to the enclosed drawing. In this drawing FIG. 1 shows a side view of an elevator shaft with a linear elevator motor according to the invention comprising two parallel stator beams, FIG. 2 shows a horizontal cross-section of the parts of the elevator motor and the guide rails in the area between the elevator car and the shaft wall of FIG. 1, FIG. 3 shows a cross-section through a stator beam and a mover of FIG. 2, FIG. 4 shows an enlarged view of FIG. 3 with the brake surfaces of mover and stator, FIG. 5 shows a schematic drawing of the function of a switching permanent magnet motor (FSPM) used as the elevator motor, FIG. 7 shows a horizontal cross-section of the connecting part between the shaft wall and an elevator car at the mover position, having a U-profile mover and a contactor contacting a bus bar located at the elevator shaft wall, FIG. 8 shows a horizontal cross-section of the connecting part between the shaft wall and an elevator car at the car guide position, showing a guide element of the elevator car with two pivoted guide rollers which guide element is running along guide surfaces of the stator beam of FIG. 7, FIG. 9 shows a schematic side view of an elevator system having two elevator shafts which are connected with horizontal passages at each elevator floor whereby the landing doors are located in the area of the horizontal passages between each shaft.

DESCRIPTION OF THE PREFERRED EMBODIMENTS

Figure 6:
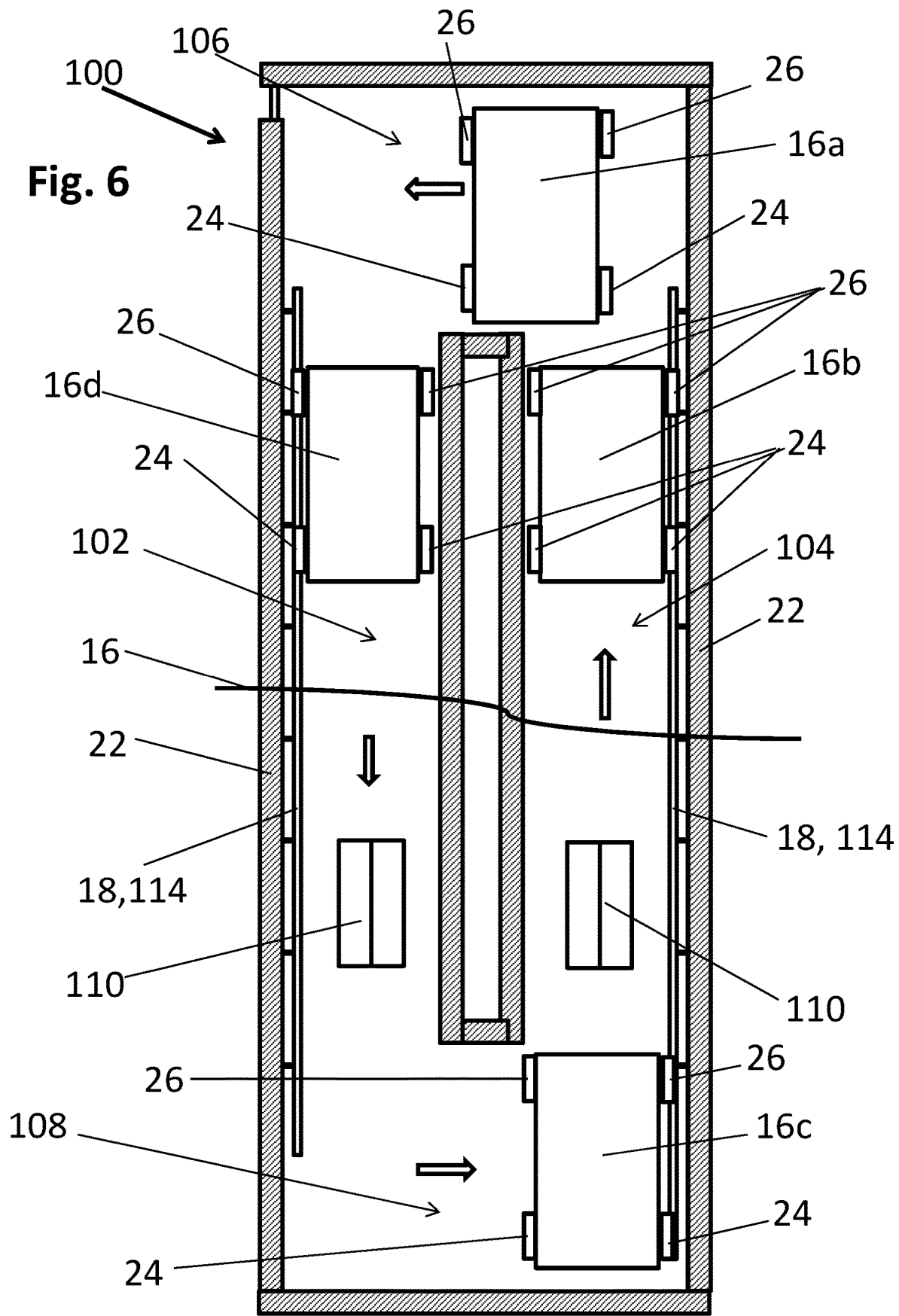
FIG. 6 shows a side view of an elevator having two elevator shafts which are connected at their upper and lower ends with horizontal passages.

It is emphasized that identical parts or parts with the same functionality are designated by the same reference numbers in all figures.

FIG. 1 shows an elevator 10 comprising an elevator shaft 12 wherein an elevator car 16 moves up and down as an element to be moved. The elevator 10 has a linear elevator motor 14. The linear elevator motor 14 comprises stators 50 (see FIG. 3) located in a side face of a stator beam 18 which is mounted with fastening elements 20 to a shaft wall 22 of the elevator shaft 12. In this example the elevator 10 has two parallel stator beams 18, which can be seen in FIG. 2.

The elevator car 16 comprises two movers 24, 26 located one above the other. The lower mover 24 is located in the lower half of the elevator car whereas the upper mover 26 is located in the upper half of the elevator car. These two movers 24, 26 comprise electro-magnetic components as e.g. irons, windings and permanent magnets 70, 71, 72, 74, 76 (FIG. 4) which co-act with stator poles 52 located in the side faces of the stator beam 18, formed by stator teeth. Accordingly, the elevator car travels upwards and downwards via corresponding control of both movers 24, 26 co-acting with the stator beams 18.

Of course, the elevator car has a corresponding set of two movers 24, 26 for each vertical stator beam 18 so that the elevator car 16 has in total four movers, two lower movers 24 and two upper movers 26 to co-act with two stator beams 18.

Of course, each stator beam 18 may have one or several stators 50 as it is shown in FIGS. 2 and 3.

Although it is preferred that the stator beams 18 and movers 24, 26 of the elevator 10 of FIG. 1 also form an electro-magnetic guide for the elevator car 16 so that any guide rollers and guide rails can be omitted, FIG. 2 shows in one embodiment optional car guides 32, 34 of the elevator car 16 co-acting with optional guide rails 28 running vertically along the shaft wall 22 of FIG. 1. The shaft wall 22 comprises two parallel guide rails 28, 30 co-acting with corresponding car guides 32, 34. Each car guide 32, 34 has a set of guide rollers co-acting with the car guide rails 28, 30. As these car guides 32, 34 in connection with the car guide rails 28, 30 are configured for a rucksack type suspension, the corresponding guide system 28, 30, 32, 34 is configured to keep the car 16 horizontally in connection with the shaft wall 22 as these both car guide rails 28, 30 are the only guide rails of the elevator car 16 in the shaft 12. The vertical stator beams 18 as well as the movers 24, 26 of the elevator car 16 are shown in more detail in FIG. 3. Generally, guide rails with a round cross-section may be used which are surrounded by rollers of the car guide, thereby fixing the car horizontally in connection with the guide rail.

According to FIG. 3 the vertical stator beam 18 comprises a metal support structure 40 with a square cross-section. On each side the support structure 40 carries a metal stator rod 50 comprising stator teeth 52, which form the four side faces 42, 44, 46, 48 of the stator beam 18. Each of these stator rods (or bars) 50 with the stator teeth 52 forms a stator of the linear motor 14 so that the stator beam 18 shown in FIG. 3 comprises four stators. The stator teeth 52 co-act with windings 74, 76 (FIG. 4) and mover irons 70,72 and permanent magnets 71 located along counter-faces 54 in the four arms 56, 58, 60, 62 of the C-type profile of the mover 24, 26. This C-type profile of the mover surrounds the stator beam 18 but leaves an opening 64 for the adaption of the fastening elements 20, as the mover 24, 26 travels along the shaft 12.

The stator rods 50 on all four side faces 42, 44, 46, 48 have the same pitch d. Anyway, the first and third side face 42, 46 of the stator beam also have an identical teeth position in vertical direction whereas the second and fourth side face 44, 48 have the same pitch but the teeth position is vertically offset with respect to the stator teeth 52 on the first and third side face 42, 46 by a ¼ pitch.

Via this arrangement, it is ensured that on one hand, the horizontal forces between the stators 50 on opposite sides eliminate each other whereas the vertical offset of the pitches of the side faces oriented rectangular leads to a better efficiency and a smoother run of the elevator motor, as a moving step of such a motor 14 is a half pitch. By the fact that four stators 50 are located within the stator beam 18 the force generated between the movers 24, 26 and the stator beam 18 is multiplied by four, thereby achieving less horizontal ripples and a smoother movement of the movers 24, 26 with respect to the vertical stator beam 18.

FIG. 4 shows an enlarged view of FIG. 3. The stator has on its four side faces 42, 44, 46, 48 aside of the stator rods 50 stator brake surfaces 51 which are preferably releasably mounted to the side faces 42, 44, 46, 48, so that they may be replaced when worn. In the same manner the counterfaces 54 of the mover comprise mover brake surfaces 55 which counteract with the stator brake surfaces when the electromagnetic components 74, 76 of the mover are de-energized after stop of the elevator car. This counteraction leads to reliable support of the elevator car 16 even if fully loaded. Before the car starts moving the electro-magnetic windings 74, 76 of the mover are energized to establish the necessary air gap between stator side faces 42, 44, 46, 48 and mover counterfaces 54 and then the windings 74, 76 are energized to move the car. The brake interface 51, 55 consisting of the stator and mover brake surfaces 51, 55 ensures a reliable braking of the car 18 even in case of AC mains power shutdown.

FIG. 5 shows the operation principle of the flux switching permanent magnet motor formed by the movers 24, 26 and the stators 50 in the stator beam 18. The stator rod 50 comprises stator teeth 52 which are spaced apart by teeth gaps 53. The pitch d of the stator teeth 52 is identical throughout the length of the stator rod 50. The stator in the stator beam 18 in a longer vertical shaft 12 can be comprised of one single stator rod 50 with a corresponding length or by several stator rods 50 located one above each other, according to the required shaft length. In the connecting areas of stator rods located above each other the pitch d has to be maintained.

The mover 24, 26 comprises on each counter-face 54 a succession of two mover irons 70, 72 between which one thin magnet 71 is located. This package of mover irons 70, 72 and magnet 71 is followed by two windings 74, 76 which are controlled as to produce a magnetic field with opposite direction. This succession 70, 71, 72, 74, 76 of mover irons, permanent magnets and windings is repeated according to the length of the mover. The movement of the mover 24, 26 with respect to the stator rod is accomplished by controlling the both windings 74, 76 to switch the flux direction to the opposite so that with each switching, the mover 24, 26 moves half of the pitch d of the stator teeth 52. Thus, the mover 24, 26 can be controlled to move according to the arrows in upwards or downwards direction with respect to the stator rod 50.

FIG. 6 shows an elevator 100 having two elevator shafts 102, 104 which are connected by an upper horizontal passage 106 at the top end of both shafts 102, 104 as well as a lower horizontal passage 108 at the bottom end of both elevator shafts 102, 104. Thus, the both elevator shafts 102, 104 with the upper and lower horizontal passage 106, 108 form a closed loop whereby the movement of the elevator cars 16a-16d is only allowed in one direction according to the arrows shown in the figure. By this measure it is ensured that cars run only in one direction in each of the shafts which lead to a higher transport capacity and to an easier control of the cars in the shaft.

In both elevator shafts 102, 104, vertical stator beams 18, 114 e.g. according to one of the previous embodiments, or according to FIGS. 6 and 7 are located which co-act with movers 24, 26 located at the elevator cars 16a-16d. Each shaft 102, 104 may comprise preferably two, three or four parallel stator beams 18, 114. The figure shows landing doors 110 located in the first elevator shaft 102 as well as in the second elevator shaft 104. The cars 16a-16d are horizontally moved in the horizontal passages 106, 108 in a not specified manner by horizontal moving mechanisms, e.g. those shown in connection with FIGS. 9 and 10.

Both elevator shafts are cut out along the cutting line 112 for clarity reasons, as normally this concept is preferably designed for high-rise elevators having 20 floors or more. Accordingly, the two shafts 102, 104 are able to accommodate a much larger number of elevator cars than the four cars 16a-16d shown in the figure. Each car 16a-16d is able to move largely independent of the others within the two shafts 102, 104 except the fact that collisions between cars have to be avoided. By the fact that in the first elevator shaft 102 the elevator cars 16a-16d only drive downwards and in the second elevator shaft 104 only drive upwards, the probability of mutual affection is decreased. Furthermore, by this circular moving scheme, the transport capacity of both shafts is drastically increased on one hand because now the two elevator shafts may comprise much more elevator cars than in conventional systems and on the other hand, because in each elevator shaft, all elevator cars only move in the same direction, avoiding counter-movements of cars which reduce an economic shaft use and necessitate extensive anti-collision control.

FIG. 7 shows a vertical stator beam 114 which may be used in connection with the elevator 100 shown in FIG. 6 and with the elevator 200 shown in FIG. 9.

The vertical stator beam 114 comprises five side faces 116, 118, 120, 122, 124. The first side face 116 directed to the elevator car 16a-16d as well as the fourth and fifth side face 122, 124 directed to the shaft wall 22 are guide faces co-acting with guide rollers of a car guide 140 as shown in FIG. 7. The second side face 118 and the third side face 120 of the vertical stator beam 114 comprise stator rods 50 with stator teeth 52 which co-act with permanent magnets and windings 70, 71, 72, 74, 76 located in the counter-faces 54 of a mover 126 of the elevator car 16a-16d. The mover 126 is embodied as a U-profile which is mounted with a mounting element 128 to the elevator car 16a-16d. The mounting element may also be a screw or a bolt or the like such that the U-profile 126 is directly mounted to the car 16a-16d, eventually with a dampening layer in-between. As the two stator rods 50 on the second and third side faces 118, 120 of the vertical stator beam 114 are opposed to each other, the horizontal forces between the stators 50 of the vertical stator beam 114 and the components 70, 71, 72, 74, 76 of the mover 126 are compensated. On the other hand, the shaft wall 22 comprises a bus bar 130 with four vertically running connector rails 132 from which three connector rails 132 are the three phases of an AC mains network and one of the vertical connector rails 132 is a control connector connecting the elevator car with the elevator control. The elevator car comprises a contactor 134 which is pressed via a telescopic spring support 136 against the elevator car 16a-16d. Via this contactor 134, the elevator car 16a-16d is provided with electric power for the operation of the mover 126 as well as for all further car components needing electric power, as e.g. doors, I/O, lighting etc.

The vertical stator beam 114 of FIG. 7 has the advantage that it does not only support the stators 50 of the electric motor 14 of the elevator but it also provides the guide faces 116, 122, 124 to guide the car in the shaft 12, 102, 104 in connection with a car guide 32, 34, 140. The car guide 140 comprises three guide rollers 142, 144, 146 which are running on the three guide faces 116, 122, 124 of the vertical stator beam 114. The second and third guide roller 144, 146 located adjacent the shaft wall 22 are supported on pivot arms 148 which are pivotally hinged on a pivoting mechanism 150 as to be moved away from the corresponding guide surfaces 122, 124 of the vertical stator beam 114. Via this means, the vertical stator beams 114 can be released from the contact with the car guides 32, 34 by moving the car horizontally away from the shaft wall 22. As also the mover 126 is according to FIG. 6 a U-profile open to the shaft wall 22, also the mover 126 can be moved away from the vertical stator beam 114 in a horizontal direction away from the elevator shaft wall 22. Thus, the elevator cars 16a-16d can be released from the corresponding vertical stator beams 114 when moved with the horizontal moving mechanism in the upper and lower horizontal passage 106, 108 of FIG. 6, e.g. as shown in FIGS. 9 and 10.

FIG. 9 shows a second embodiment of an elevator 200 whereby the vertical stator beams 114 correspond to the stator beams shown in FIGS. 7 and 8 and the car guides 140 of the cars 16a-16d of FIG. 9 correspond preferably to the car guides 140 shown in FIG. 8. The elevator 200 of FIG. 9 comprises two elevator shafts 202, 204 which are preferably no longer separated by shaft walls. Instead, at each elevator floor, horizontal guide tracks (see also FIG. 9) 206 are extending horizontally along horizontal passages 208 located between the two elevator shafts 202, 204 whereby the term "elevator shaft" in this connection designates the vertical moving paths of the elevator cars 16a-16d in this elevator 200. The two remaining shaft walls 22 which are opposite to the horizontal passages 208 do not only comprise the vertical stator beams 114 but also the vertical bus bars 130 of FIG. 7 which are not shown for clarity reasons, as FIG. 9 focuses on the horizontal moving mechanism 205. The horizontal moving mechanism 205 comprises the horizontal guide tracks 206 on each elevator floor and a horizontal moving means 210 located on top of each elevator car 16a-16d. The horizontal moving means 210 of the elevator car comprises support rollers 212 which can be moved between a retracted position and an operational position wherein the support rollers 212 run on the horizontal guide tracks 206.

The moving pattern of the elevator cars in the elevator car 200 corresponds to that of FIG. 6 which means that in the first elevator shaft 202, the elevators all move in the same direction, i.e. upwards, whereas in the second elevator shaft 204 all elevator cars 16a-16d move downwards. Therefore, also in this elevator 200, a kind of circular movement is achieved whereby the circular movement can be shortened as the elevator cars can travel from one elevator shaft 202, 204 into the other at each elevator floor via the horizontal moving mechanism 205 comprising the horizontal guide tracks 206 and the horizontal moving means 210 of the elevator car.

Figure 10:
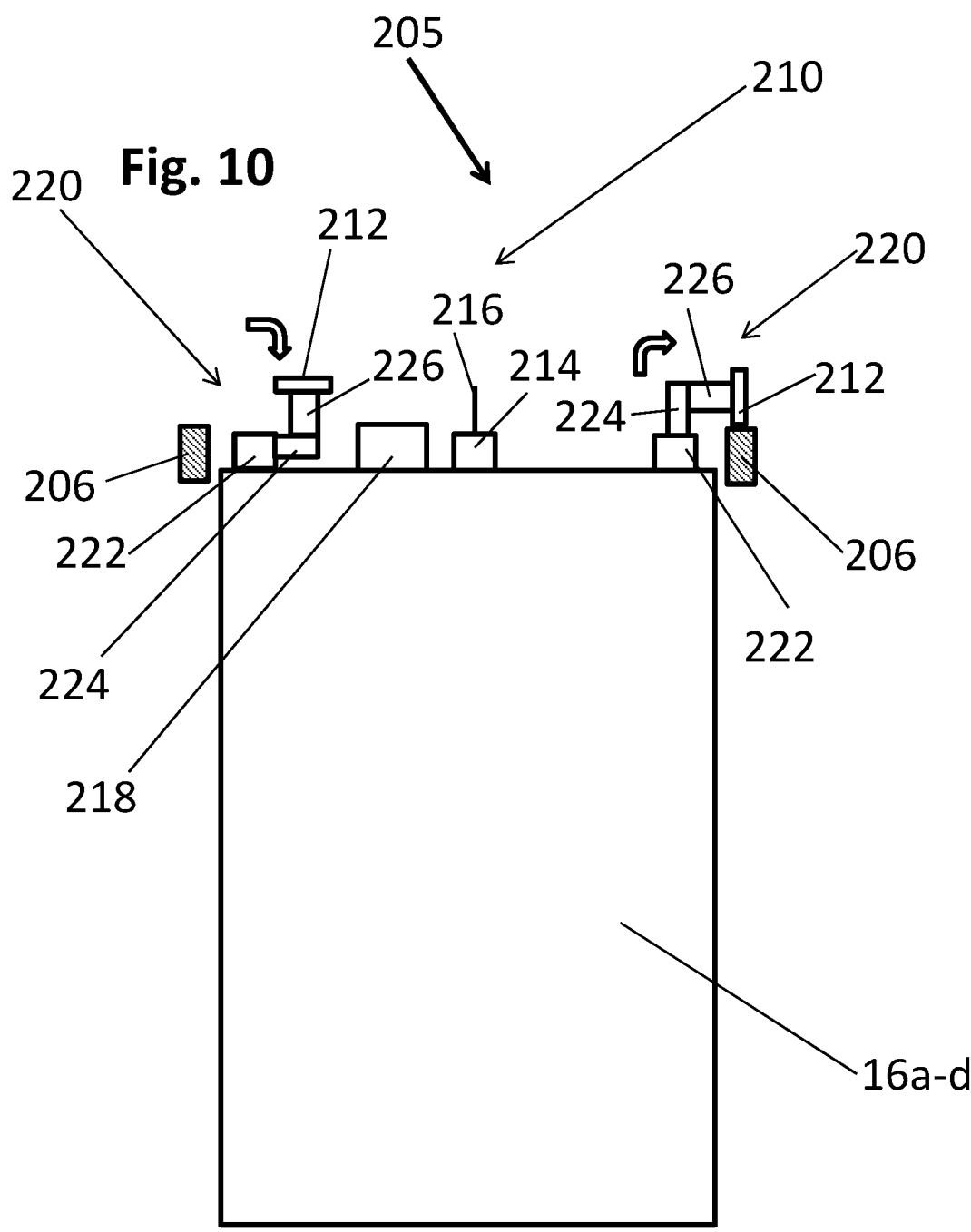
FIG. 10 shows a horizontal moving mechanism with shaft-side horizontal guide tracks and a car-side horizontal moving means comprising rollers co-acting with the horizontal guide tracks.

The function of the horizontal moving mechanism 205 based on the interaction between the horizontal guide tracks 206 and the horizontal moving means 210 of the elevator car 16a-16d is described in more detail with respect to FIG. 10. The elevator car 16a-16d comprises a car control 214 having a wireless transmission means 216 for wireless communication with the elevator control. Furthermore, the elevator car 16a-16d comprises a power source 218, preferably an accumulator, which feeds the movers 24, 26; 126 of the elevator car 16, 16a-16d as well as all other electrical components connected to the elevator car. The horizontal moving means 210 comprises of four roller arrangements 220. Each roller arrangement 220 comprises a mounting base 222 on which a support arm 224 is pivotally hinged. The support arm 224 can be moved between a retracted position (shown on the left side of the figure) and an operational position (shown on the right side) in which the support roller 212 runs on top of the horizontal guide track 206. Connected with the support arm 224 is a drive member 226 on which the support roller is supported. The drive member comprises an electric motor which is configured to rotate the support roller 212 on the horizontal guide track 206. It is self-evident that any operation of the pivot mechanism in the mounting base 222 can be prohibited when the support roller is currently positioned in the retracted position shown on the left side as well as in the operational position of the support roller 212 on the horizontal guide track 206. Therefore a locking mechanism (not shown) is preferably provided to lock the corresponding positions.

Figure 11:
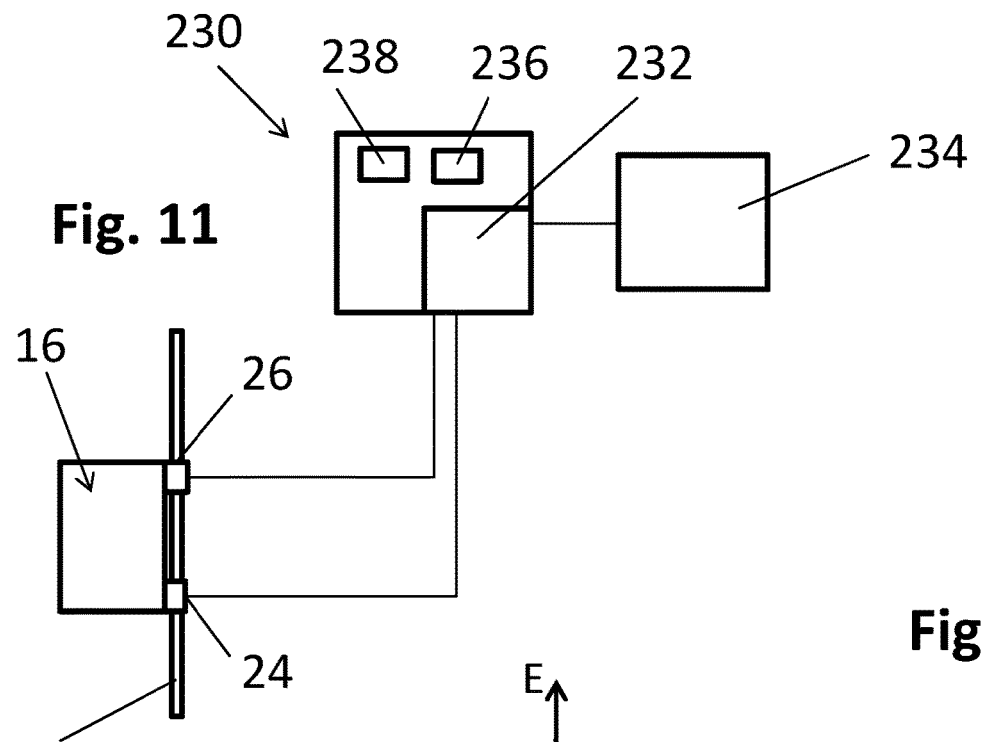
FIG. 11 shows a schematic view of the elevator control controlling two movers in a brake test mode.

FIG. 11 shows an embodiment of the invention with an elevator (motor) control 230, preferably comprising an emergency stop circuit 232 backed-up by an backup power supply 234, preferably a battery.

The elevator control 230 energizes the windings 74, 76 of the movers 24, 26 on one hand as to provide an air gap between stator side faces 42-48 and counterfaces 54 of the mover 24, 26. On the other hand the elevator control energized the windings 74, 76 as to move the car along the stator beams 18.

Before the car begins to move the elevator control 230 energizes the windings 74, 76 as to provide the air gap and only afterwards starts to energize the windings in a way as to move the car. In contrast when the car shall stop at a floor or in emergency cases the windings 74, 76 are energized as to decelerate the car 16 to stop and only then de-energizes the windings 74, 76 totally as to shut down the air gap which leads to the support of the car 16 on the stator beam 18 via the brake interface 51, 55.

Figure 12:
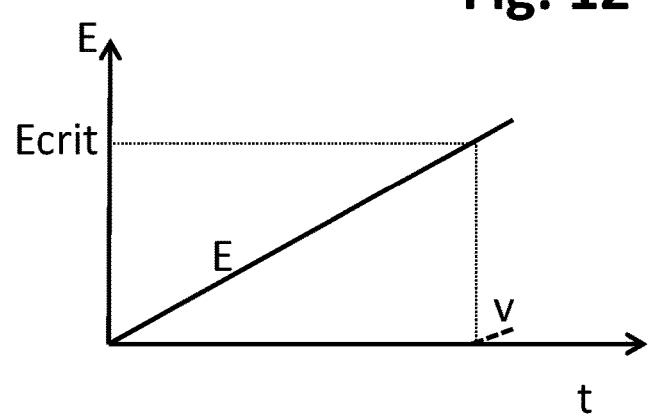
FIG. 12 shows a diagram with the energization of the electromagnetic components of the mover versus time until the elevator starts moving.

The elevator control 230 comprises a braking test circuit 236 which in a braking test mode (when the windings are totally de-energized (car is stopped) and the brake interface is active) energizes only a part of the movers, e.g. the lower movers 24 of the elevator car 16 whereas the other movers, e.g. the upper movers 26 are de-energized. Via increasing the energization of the energized movers 24 the force acting on the brake interface 51, 54 increases until the brake interface 51, 55 is no longer able to withstand the force, which is when the car starts moving (see velocity v in FIG. 12). The energization at this point is the critical energization $E_{crit}$ (see FIG. 12). This critical energization $E_{crit}$ is an essential value to determine the functional state of the brake interface 51,55 which forms the brake of the elevator. This can be done in a way which is e.g. shown in FIG. 13.

The emergency stop circuit 232 of the elevator control ensures safe deceleration and stop of the elevator car in all abnormal operation conditions of the elevator, particularly in case of an AC power failure. In this case the elevator control immediately switches the power supply for the mover windings 74, 76 to the backup power supply 234. Thereby the elevator control 230 maintains the air gap between stator side faces 42 to 48 and the mover counterfaces 54 and additionally decelerates the car to stop either with a defined deceleration and/or within a defined stopping distance. After car stop the mover windings 74, 76 are de-energized as to activate the brake interface 51, 55 so that the car 16 is safely supported on the stator beams 18. Preferably the car might be driven in an emergency car ride to the next floor in driving direction so that the passengers may leave the car. This option is only provided for emergency situations in which the elevator car is allowed to drive to the next floor, e.g. in case of a power failure of AC mains.

Optionally the elevator control 230 may comprise a battery monitoring circuit 238 for the backup power supply 234 to ensure functionality of the backup power supply in emergency situations. This battery monitoring circuit may issue a battery change signal if the battery performance decreases.

Figure 13:
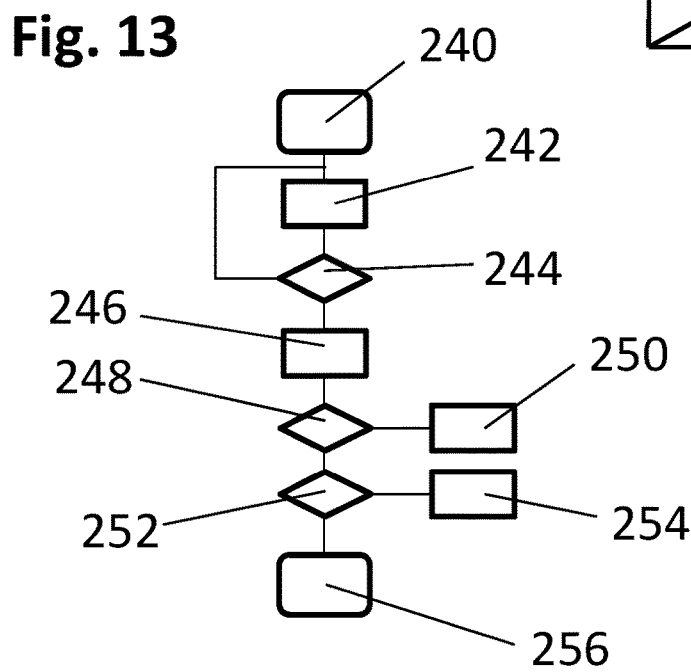
FIG. 13 shows a diagram regarding the use of the critical energization for deriving brake status information/perform failure measures.

FIG. 13 show a schematic diagram of the checking of the functional state of the elevator brake, formed by the brake interface 51, 55.

At the start 240 of the brake test mode the brake test circuit 236 de-energizes a part of the movers 24 whereas the other movers 26 are energized. In step 242 the energization (current flow) of the windings 74, 76 of the energized movers 26 is increased.

In the first deciding step 244 it is checked whether the elevator car starts moving which information is obtained via position sensors and/or velocity sensors and/or acceleration sensors of the elevator. If the elevator does not start moving the process loops back to step 242 wherein the energization is further increased. If the elevator starts moving the first deciding step 244 branches to log step 246 wherein the critical energization when the car began moving is recorded. In the second deciding step 248 the critical energization is compared with a first threshold value. If the critical energization is above this first threshold value the process moves to the third deciding step 252. If the critical energization value is below the first threshold value the elevator is taken out of service in step 250 and a notice is given to a remote maintenance center, possibly comprising the critical energization value and optionally the first threshold value.

In the third deciding step 252 the critical energization value is compared with a second threshold value which is higher than the first threshold value. When the critical energization (current) is below the second threshold value a maintenance signal is issued to a remote maintenance canter in step 254. This signal may comprise information about the critical energization value as well as about one or both threshold values.

The braking mode is stopped in termination step 256 whereafter the normal operating mode of the elevator is started wherein regularly all movers 24, 26 of the elevator are energized/de-energized synchronously.

It is clear for the skilled person that the retracted and operational position of the support roller 212 is controlled in synchronization with the initiation and releasing of the contact between the movers 126 and the corresponding vertical stator beams 114. Via this arrangement, it is ensured that the car is always supported in vertical direction either by the force of the mover 126 on the vertical stator beam 114 or by the support of the support rollers 212 on the horizontal guide tracks 206.

Thus, safety of the elevator car is maintained even without elevator guide rails and/or a gripping device.

Accordingly, also in this new multi-shaft multi-car arrangement of the invention, the safety of the elevator cars 16a-16d is always ensured independent whether the car is currently supported by the movers 126 and the vertical stator beams 114 or by the support rollers 212 on the horizontal guide tracks 206.

The invention can be carried out within the scope of the appended patent claims. Thus, the above-mentioned embodiments should not be understood as delimiting the invention.

LIST OF REFERENCE NUMBERS 10 elevator
12 elevator shaft
14 elevator motor
16 elevator car
18 stator beam
20 fastening elements
22 shaft wall/shaft side
24 lower mover
26 upper mover
28 first guide rail
30 second guide rail
32 first car guide
34 second car guide
40 support structure
42 first side face
44 second side face
46 third side face
48 fourth side face
50 stator/stator rod
51 stator brake surface—stator braking pad
52 stator teeth
53 teeth gaps
54 counter face of mover
55 mover brake surface—mover braking pad
56 first arm of C-profile mover
58 second arm of C-profile mover
60 third arm of C-profile mover
62 fourth arm of C-profile mover
70 first mover iron
71 permanent magnet
72 second mover iron
74 first winding
76 second winding
100 elevator (second embodiment)
102 first elevator shaft
104 second elevator shaft
106 upper horizontal passage
108 lower horizontal passage
110 landing door
114 stator beam (second embodiment)
116 first side face (first guide face)
118 second side face
120 third side face
122 fourth side face (second guide face)
124 fifth side face (third guide face)
126 mover (second embodiment)
128 mounting element
130 bus bar
132 connector rails
134 contactor
136 spring support
140 car guide (second embodiment)
142 first guide roller, at the car side
144 second guide roller, at the shaft wall side
146 third guide roller, at the shaft wall side
148 pivot arm
150 pivoting mechanism
200 elevator (third embodiment)
202 first elevator shaft
204 second elevator shaft
205 horizontal moving mechanism
206 horizontal guide track
208 horizontal passage
210 horizontal moving means mounted to the elevator car
212 support roller
214 car control
216 wireless transmission means
218 power supply
220 roller arrangement
222 mounting base
224 support arm
226 drive member
230 elevator control
232 emergency stop circuit
234 backup power supply
236 brake test circuit
238 battery monitoring circuit
240 start of brake test mode—a part of the movers is energized, a part is de-energized
242 increasing the energization/current of the energized mover
244 first deciding step—car starts moving?
246 recording the critical energization/current
248 second deciding step—first threshold value passed by critical energization value?
250 elevator taken out of service
252 third deciding step—second threshold value passed by critical energization value?
254 maintenance requested for the elevator
256 end of the brake test mode

The invention claimed is:

1. An elevator comprising:
an electric linear motor comprising at least one linear stator designed to be located in a fixed correlation to an environment and at least one mover designed for connection with an elevator car to be moved and co-acting with the stator to move the car,
which motor comprises a stator beam supporting said at least one stator, which stator beam has at least one side face carrying ferromagnetic poles of said stator spaced apart by a pitch, and which mover comprises at least one counter-face facing said side face(s) of the stator beam, in which counter-face electro-magnetic components of the mover are arranged to co-act with the ferromagnetic poles mounted on the stator beam, which elevator comprises an elevator brake, wherein the side face of the stator beam facing the mover and/or the counter face of the mover facing the side face of the stator beam comprise(s) a brake surface which form(s) the brake interface of the elevator brake.

2. The elevator according to claim 1, wherein the side face of stator beam facing the mover and/or the counter face of the mover facing the side face of the stator beam comprises a brake pad, which is releasably mounted to the mover/stator beam.

3. The elevator according to claim 1, wherein the electromagnetic components of the mover are configured to establish a magnetic counter-field keeping the counterface of the mover with a defined air gap to the stator beam's side face when energized whereas the mover's counterface is configured to be pulled against the stator beam's side face by the force of the permanent magnets, when the electromagnetic components of the mover are de-energized.

4. The elevator according to claim 2, wherein the elevator comprises a backup-power supply and an emergency stop circuit, which emergency stop circuit is connected to a position and/or velocity and/or acceleration sensor of the elevator, and which emergency stop circuit is configured to adjust the energization of the electromagnetic components of the mover depending on the signal of the above sensor(s).

5. The elevator according to claim 4, wherein the backup-power supply is a battery.

6. The elevator according to claim 5, comprising a battery monitoring circuit for monitoring the functional status of the battery.

7. The elevator according to claim 4, wherein the emergency stop circuit is configured to adjust the energization of the electromagnetic components of the mover such that the car stops within a defined stopping distance.

8. The elevator according to claim 1, wherein the car comprises at least two movers and wherein the elevator control comprises a brake test circuit configured to operate in a brake test mode wherein one mover is energized whereas the other mover is de-energized when the car is not moving and/or stopping at a floor.

9. The elevator according to claim 8, wherein the brake test circuit of the elevator control is configured to increase the energization of the energized mover until the car starts moving, and that the elevator control is configured to issue a report to a maintenance center comprising the critical energization at the point when the car starts moving.

10. The elevator according to claim 8, wherein the brake test circuit of the elevator control is configured to issue failure signal and/or to put the car out of service when the critical energization exceeds at least one defined threshold value.

11. The elevator according to claim 1, wherein each mover has a load sensor arranged between the car and the mover to measure total weight of car.

12. A method for operating an elevator with a linear motor, which linear motor comprises at least one linear stator designed to be located in a fixed correlation to an environment and at least one mover designed for connection with an elevator car to be moved and co-acting with the stator to move the car, which motor comprises a stator beam supporting said at least one stator, which stator beam has at least one side face carrying ferromagnetic poles of said stator spaced apart by a pitch, and which mover comprises at least one counter-face facing said side face(s) of the stator beam, in which counter-face electro-magnetic components of the mover are arranged to co-act with the ferromagnetic poles of the stator beam, wherein the side face of the stator beam facing the counterface of the mover and/or the counter face of the mover facing the side face of the stator beam comprise a brake surface which is used as the brake interface of the elevator brake when the electromagnetic components of the mover are at least partially de-energized.

13. The method according to claim 12, wherein the electromagnetic components of the mover are de-energized dependent on the signal of a position- and/or velocity- and/or acceleration sensor of the elevator.

14. The method according to claim 12, wherein the mover is de-energized when the car stops at an elevator floor.

15. The method according to claim 12, wherein a car with at least two movers is used, whereby in a brake test mode at least one of the movers is energized whereas at least one other mover is de-energized.

16. The method according to claim 15, wherein car has N movers, the method comprises the succession of following steps:
an empty car is kept standstill by providing a driving force upwards with all the N movers, and total current Lot of all N movers is determined
current of one of the movers is interrupted to apply the mover as an elevator brake, and driving current of each of the other movers is at the same time raised to a value: $I_{tot}/(N-1)$
the driving current of each of the other movers is gradually decreased, and movement of elevator car is observed
when movement of elevator car is detected, the driving current at the moment movement started is recorded, and the recorded current is compared to a reference value
if the recorded current is higher than the reference value, safety measures with the elevator are performed.

17. The method according to claim 15, wherein car has N movers, and each mover has a load sensor, such as a strain gauge, arranged between the car and the mover to measure total weight of the car, the method comprising:
current of one of the movers is interrupted to apply the mover as an elevator brake,
an empty car is kept standstill by providing a driving force upwards with the other N−1 movers, such that the load sensor of the mover applied as an elevator brake indicates zero weight,
the driving current of the other N−1 movers is gradually decreased, and movement of elevator car is observed,
when movement of elevator car is detected, the reading of the load sensor of the mover applied as an elevator brake at the moment movement started is recorded, and the recorded reading is compared to a reference value
if the recorded reading of the load sensor is lower than the reference value, safety measures with the elevator are performed.

18. The method according to claim 15, which brake test mode is performed when the car is stopping at a floor.

19. The method according to claim 15, wherein the energization of the energized mover is increased until the car starts moving.

20. The method according to claim 18, wherein a critical energization when the car starts moving is compared to at least one threshold value and that safety measures with the elevator are performed when the threshold value is exceeded.

21. The method according to claim 20, wherein the safety measures comprises at least one of the following steps:
  sending a log report with the energization when the car starts moving to a maintenance center
  sending a log report with the threshold value which the energization was compared to a maintenance center
  putting the elevator out of service
  issuing a maintenance request.

* * * * *